United States Patent
Ryu et al.

(10) Patent No.: US 9,425,474 B2
(45) Date of Patent: Aug. 23, 2016

(54) METHOD AND SYSTEM FOR CONTROLLING AIR INTAKE OF FUEL CELL VEHICLE

(71) Applicant: Hyundai Motor Company, Seoul (KR)

(72) Inventors: Jung Hwan Ryu, Gyeonggi-Do (KR); Soon Il Jeon, Gyeonggi-Do (KR); Dong Hun Lee, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 114 days.

(21) Appl. No.: 14/558,629

(22) Filed: Dec. 2, 2014

(65) Prior Publication Data

US 2015/0340717 A1  Nov. 26, 2015

(30) Foreign Application Priority Data

May 21, 2014 (KR) .......................... 10-2014-0060754

(51) Int. Cl.
*H01M 8/04* (2016.01)

(52) U.S. Cl.
CPC ...... *H01M 8/04992* (2013.01); *H01M 8/04089* (2013.01); *H01M 8/04395* (2013.01); *H01M 8/04574* (2013.01); *H01M 8/04753* (2013.01); *H01M 2250/20* (2013.01); *Y02E 60/50* (2013.01)

(58) Field of Classification Search
CPC .................... H01M 2250/20; H01M 8/04089; H01M 8/04574; H01M 8/04753; H01M 8/04992
See application file for complete search history.

(56) References Cited

U.S. PATENT DOCUMENTS

2004/0023083 A1    2/2004  Yang et al.

FOREIGN PATENT DOCUMENTS

| JP | H06-243886 A | 9/1994 |
| JP | H07-014598 A | 1/1995 |
| JP | H11-288731 A | 10/1999 |
| JP | 2004-180455 A | 6/2004 |
| KR | 10-2007-0106334 A | 11/2007 |
| KR | 10-1272511 B1 | 6/2013 |

*Primary Examiner* — Carlos Barcena
(74) *Attorney, Agent, or Firm* — Mintz Levin Cohn Ferris Glovsky and Popeo, P.C.; Peter F. Corless

(57) ABSTRACT

A method and a system are provided for controlling an air intake of a fuel cell vehicle. The method includes calculating a value for basic air intake of a fuel cell based on a driver requirement and calculating a value of motor current requirement based on the driver requirement. A rate-of-change is calculated of the value of motor current requirement and a value for supplementary air intake is calculated by multiplying the rate-of-change of the value of motor current requirement by a gain value. A value for final air intake is then calculated by adding the value for basic air intake and the value for supplementary air intake. An air blower of an air intake system of the fuel cell is operated with the value for final air intake.

16 Claims, 4 Drawing Sheets

METHOD AND SYSTEM FOR CONTROLLING AIR INTAKE OF FUEL CELL VEHICLE

CROSS REFERENCE TO RELATED APPLICATION

The present application claims priority to Korean Patent Application No. 10-2014-0060754, filed May 21, 2014, the entire contents of which is incorporated herein for all purposes by this reference.

BACKGROUND

1. Field of the Invention

The present invention relates generally to a method and a system for controlling an air intake of a fuel cell vehicle to maintain a particular amount of air flow preemptively to supply more stable output power when output power of the fuel cell increases.

2. Description of the Related Art

For commercialization of a fuel cell vehicle, it is important to maintain substantially stable output power performance and durability of the fuel cell that corresponds to that of an engine of an internal combustion engine vehicle. To increase output power stability, a particular amount of air flow for target output power should be stably supplied. Since air supply using a blower is substantially slow, durability degradation and output power performance reduction may occur due to slow air supply when output power increases without maintaining a particular amount of air flow. Therefore a particular amount of air flow is required to be maintained preemptively (e.g., prior to the output power increases to prevent durability degradation and output power performance reduction). When supplying air preemptively, an excessive air supply should be avoided which may result in dry-out of the fuel cell and durability degradation.

Consequently, the fuel cell vehicle maintains a particular amount of air flow preemptively and thereby increases output power of the fuel cell more stably and ensures acceleration performance of the vehicle. Additionally, the fuel cell vehicle improves durability by avoiding a shortage of air or an excessive air supply to the fuel cell by optimization of the air supply.

In the related art, a fuel cell hybrid vehicle equipped with an additional battery, supplies air using an estimated current value of the fuel cell, which is obtained by subtracting a current value assisted by a battery from a current value required by a motor. The current value required by the motor is calculated using a motor output map based on a motor torque command value. When a motor requirement map is not accurate due to a variation of motor products, an excessive air supply or a shortage of air may occur. Such a situation may occur in an induction motor. In particular, in the induction motor, as output power is changed with a temperature of a rotor, it may be difficult to obtain an accurate motor map. The invention based on the amount of power required by a stack may not satisfy acceleration performance of a vehicle not considering the slow speed of air supply by a blower.

The foregoing is intended merely to aid in the understanding of the background of the present invention, and is not intended to mean that the present invention falls within the purview of the related art that is already known to those skilled in the art.

SUMMARY

An object of the present invention is to provide a method and a system for controlling an air intake of a fuel cell vehicle to maintain a particular amount of air flow preemptively to supply a more stable output power when output power of the fuel cell increases.

Accordingly, the method for controlling the air intake of the fuel cell vehicle may include, calculating a value for basic air intake based on a driver requirement; calculating a value of motor current requirement, (i.e., a value of current required by a motor) according to the driver requirement; calculating a rate-of-change of the value of motor current requirement; calculating a value for supplementary air intake by multiplying the rate-of-change of the value of motor current requirement by a gain value; calculating a value for final air intake by adding the value for basic air intake and the value for supplementary air intake; and operating an air blower of an air intake system of the fuel cell with the value for final air intake.

The gain value in the supplementary calculation may be increased or decreased according to a speed of the vehicle. In addition, the gain value in the supplementary calculation may be obtained by a data map to which a speed of the vehicle is input and from which the gain value is output. The gain value in the supplementary calculation may be proportional to a speed of the vehicle and the value for supplementary air intake may be calculated in the supplementary calculation by multiplying the rate-of-change of the value of motor current requirement by the gain value and then by an error value of the motor current.

The error value of the motor current may be a difference between the value of motor current requirement and a value of a motor current. The error value of the motor current may be normalized by dividing the difference between the value of motor current requirement and the value of the motor current by the value of motor current requirement. In the supplementary calculation, the value for supplementary air intake may be calculated by multiplying the rate-of-change of the value of motor current requirement by the gain value and then by an error value of the motor current, the gain value may be increased or decreased according to the speed of the vehicle. Further, the gain value in the supplementary calculation may be proportional to a speed of the vehicle. The error value of the motor current may be normalized by dividing a difference between the value of motor current requirement and the value of the motor current by the value of motor current requirement.

A method for controlling an air intake of a fuel cell vehicle may include, calculating a value for basic air intake based on a driver requirement; calculating a value of motor current requirement based on the driver requirement; calculating a rate-of-change of the value of motor current requirement; calculating a value for supplementary air intake by adding a reflection value based on a speed of the vehicle to the product of the rate-of-change of the value of motor current requirement and a gain value; calculating a value for final air intake by adding the value for basic air intake and the value for supplementary air intake; and operating an air blower of an air intake system of the fuel cell with the value for final air intake. The reflection value in the supplementary calculation may be obtained using a data map to which a speed of the vehicle may be input and from which the reflection value may be output. The reflection value in the supplementary calculation may be proportional to a speed of the vehicle.

A method for controlling an air intake of a fuel cell vehicle may include calculating a value for basic air intake and a value of motor current requirement based on a driver requirement, calculating a value for supplementary air intake by multiplying a rate-of-change of the value of motor current requirement by a gain value, calculating a value for final air intake by adding the value for basic air intake and the value for supplementary air intake, and operating an air blower of an air intake system of the fuel cell with the value for final air intake.

A system for controlling the air intake of the fuel cell vehicle for this method may include: a vehicle accelerator pedal; a vehicle drive motor; an air blower configured to supply air to the fuel cell; and a controller configured to calculate a value for basic air intake of the fuel cell and a value of motor current requirement based on an acceleration engagement degree, calculate a value for supplementary air intake by multiplying a rate-of-change of the value of motor current requirement by a gain value, and then calculate a value for final air intake by adding the value for basic air intake and the value for supplementary air intake and operate the air blower with the value for final air intake.

According to the method and the system for controlling the air intake of the fuel cell vehicle as described above, the vehicle may preemptively maintain a particular amount of air flow to supply stable output power when output power of the fuel cell increases. In other words, the vehicle may avoid a shortage of air or an excessive air supply to the fuel cell by air supply optimization, thus improving durability of the fuel cell. Additionally, as output power ascension speed of the fuel cell is improved by maintaining a particular amount of air flow preemptively, it may be possible to maintain acceleration performance of the vehicle.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

In the following, the exemplary embodiments of the present invention are described with reference to the accompanying drawings.

Figure 1:
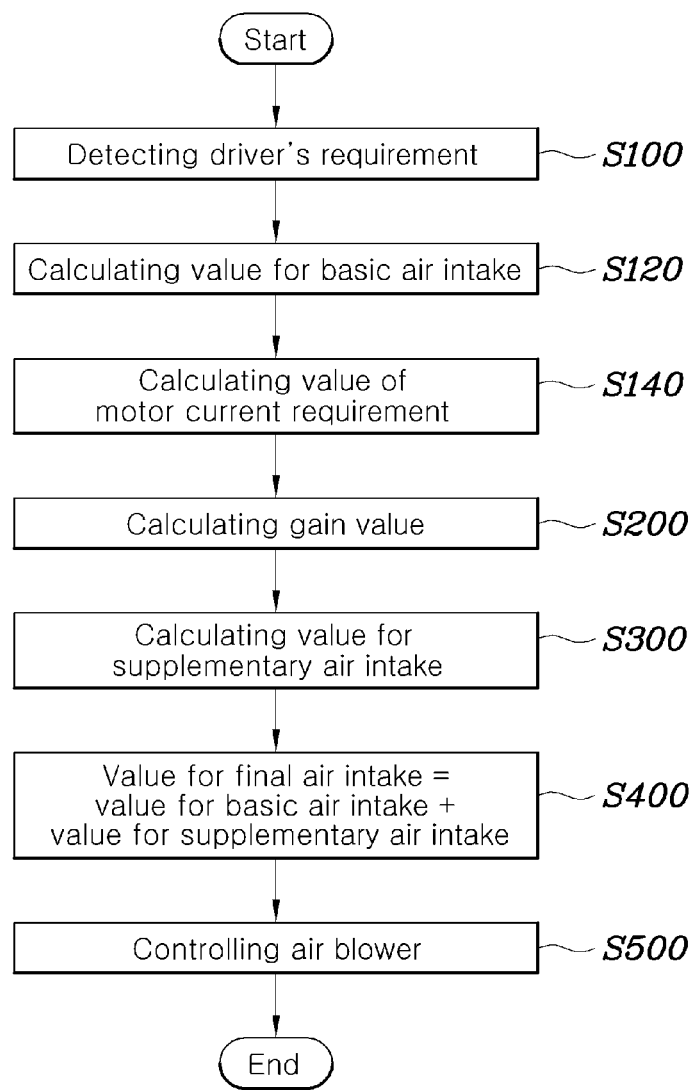
FIG. 1 is an exemplary flow diagram of a method for controlling an air intake of a fuel cell vehicle according to an exemplary embodiment of the present invention.
Figure 2:
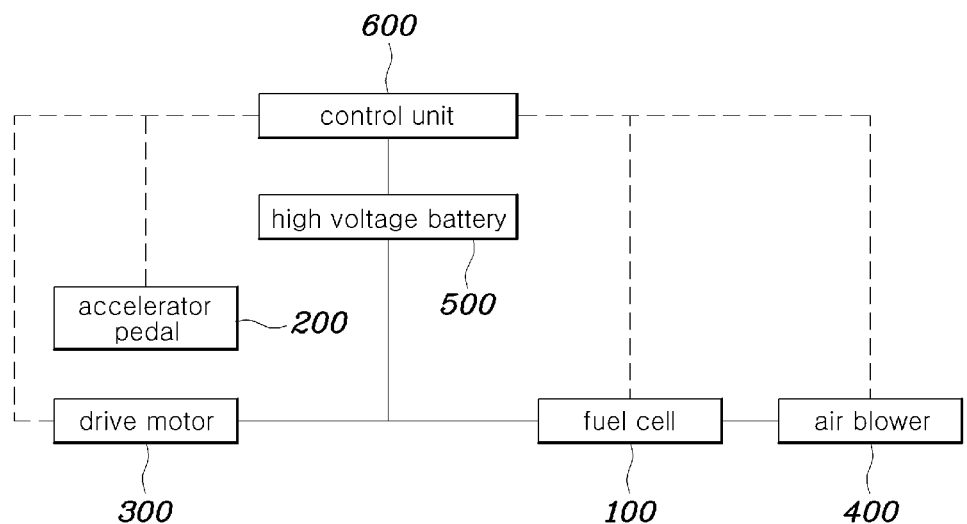
FIG. 2 is an exemplary block diagram of a system for controlling an air intake of a fuel cell vehicle according to an exemplary embodiment of the present invention.

FIG. 1 is an exemplary flow diagram of a method for controlling an air intake of a fuel cell vehicle according to an exemplary embodiment of the present invention, and FIG. 2 is an exemplary block diagram of a system for controlling an air intake of a fuel cell vehicle according to an exemplary embodiment of the present invention. FIGS. 3-6 are exemplary graphs showing effects by a method for controlling an air intake of a fuel cell vehicle according to an exemplary embodiment of the present invention.

As shown in FIG. 1, a method for controlling an air intake of a fuel cell vehicle according to an exemplary embodiment of the present invention may include: calculating, by a controller, a value for basic air intake of the fuel cell based on a driver requirement (S100, S120); calculating, by the controller, a value of motor current requirement based on the driver requirement (S140); calculating, by the controller, a rate-of-change of the value of motor current requirement; calculating, by the controller, a value for supplementary air intake by multiplying the rate-of-change of the value of motor current requirement by a gain value (S200, S300); calculating, by the controller, a value for final air intake by adding the value for basic air intake and the value for supplementary air intake (S400); and operating, by the controller, an air blower of an air intake system of the fuel cell with the value for final air intake (S500).

Specifically, for the fuel cell, the air blower may be operated with a value of current requirement of the fuel cell that corresponds to current for output power of the fuel cell. Consequently, the value for air intake of the air blower described in the following has the same meaning as the amount of the current requirement of the fuel cell.

First, the vehicle may be configured to receive the driver requirement for acceleration. A typical acceleration requirement may be detected by an accelerator opening degree, that is, an accelerator engagement amount. The controller may be configured to calculate the value for basic air intake of the fuel cell based on the driver requirement (S100, S200). In the prior art, the value for basic air intake is set as the value of the current requirement of the fuel cell, which is the value of motor current requirement according to the driver requirement exclusive of a value of available current by a high voltage battery 500, and the air blower is operated with the value for basic air intake. However, operating with the value for basic air intake creates difficulty in supplying a preemptive air supply and thus, a sense of acceleration decreases with time. The value for basic air intake of the fuel cell may be determined based on the output power that the fuel cell should generate.

Additionally, the controller may be configured to calculate the value of motor current requirement based on the driver requirement (S140) is operated. Subsequently, the rate-of-change rate-of-change of the value of motor current requirement may be calculated by the controller. In other words, the value for basic air intake may be based on the output power required in the fuel cell except for the high voltage battery while the value of motor current requirement may be based on the output power required for the whole vehicle body.

Subsequently, the value for supplementary air intake may be calculated by multiplying the rate-of-change of the value of motor current requirement by the gain value (S300) and the value for final air intake may be calculated by adding the value for basic air intake and the value for supplementary air intake (S400). Finally, the air blower of the air intake system of the fuel cell may be operated with the value for final air intake (S500). In the related art, the output power required in the fuel cell is determined and then the air blower is operated using the output power, thus increasing time to reach target revolutions per minute (rpm) of the blower and the response of the fuel cell is delayed. However, the present invention considers the output power required in the fuel cell, and compensates the value considering the output power required in the motor, and thereby the fuel cell response is more rapid.

Figure 3:
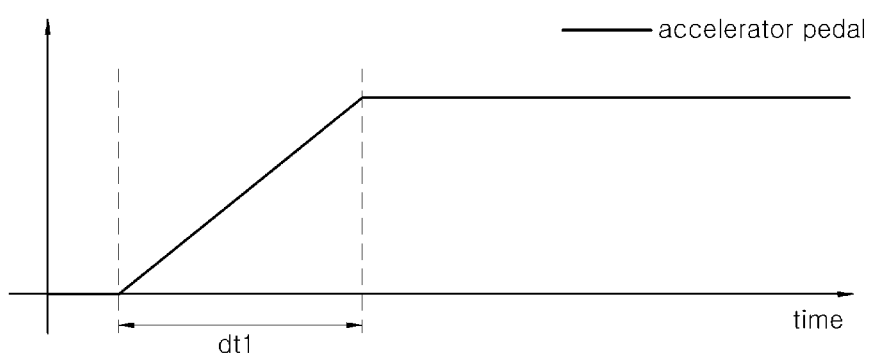
FIGS. 3-6 are exemplary graphs showing effects by a method for controlling an air intake of a fuel cell vehicle according to an exemplary embodiment of the present invention.
Figure 4:
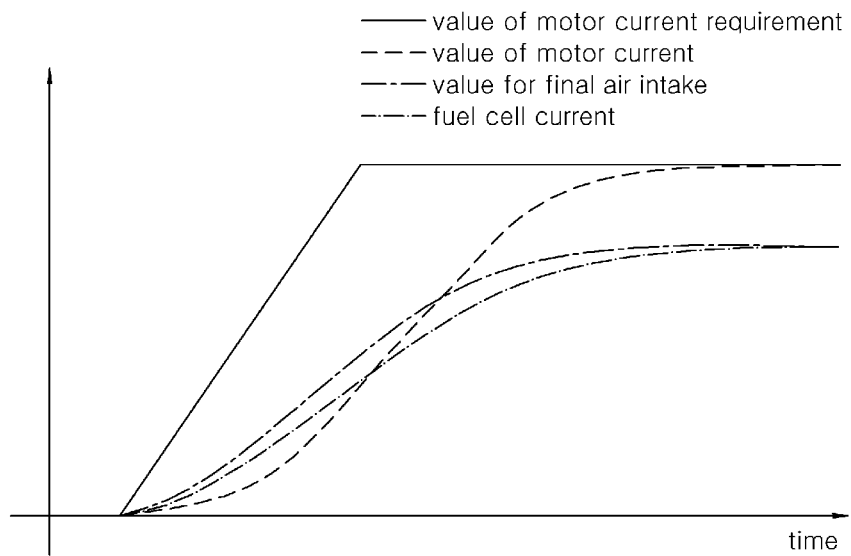
Figure 5:
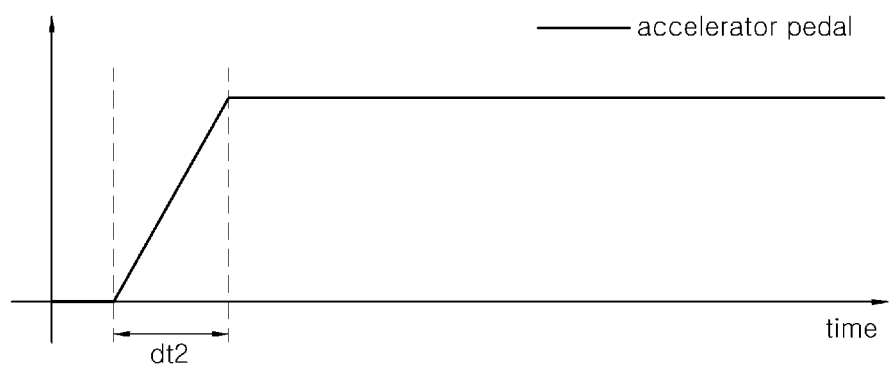
Figure 6:
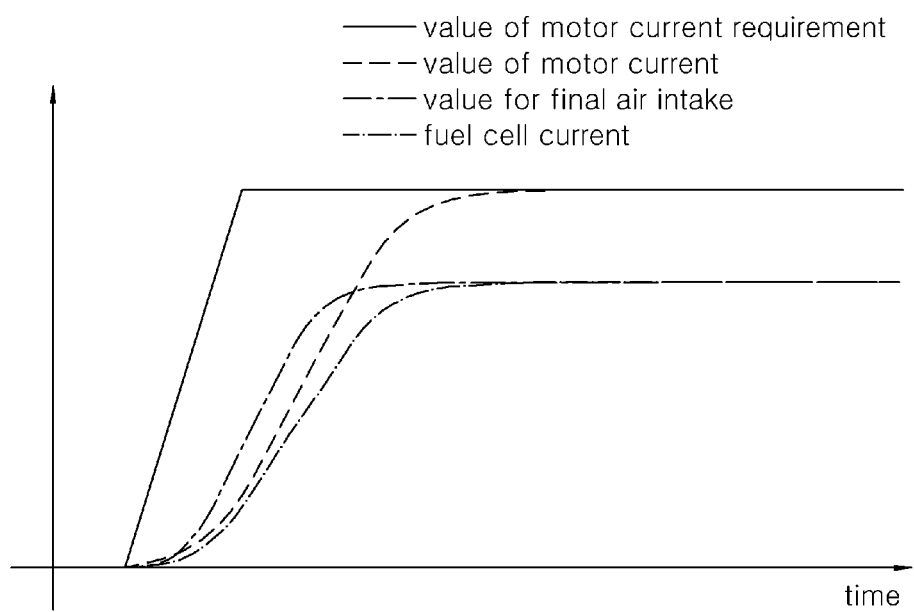

FIG. 3 shows When a driver engages the accelerator pedal slowly while FIG. 5 shows when a driver engages (e.g., applies pressure to) the accelerator pedal rapidly. FIGS. 4 and 6 illustrate the results of the pedal engagement of FIGS. 3 and 5, respectively. As shown in FIGS. 3 and 5, when a driver engages the accelerator pedal slowly or rapidly, a rate-of-change of the motor current requirement (McuCurReq) is proportional to the degree of pressure exerted on the accelerator pedal. The output power ascension speed of the fuel cell should be increased with the rate-of-change of the motor current requirement, and a supplementary amount of air (e.g., the value for supplementary air intake) to be added to the current command value of the fuel cell (e.g., the value for basic air intake), should be determined in proportion to the rate-of-change of the motor current requirement to maintain the more stable amount of air flow.

Accordingly, the value for supplementary air intake may be calculated by multiplying the rate-of-change of the value of motor current requirement by the gain value. The gain value in the supplementary calculation may be increased or decreased with the speed of the vehicle. In addition, the gain value in the supplementary calculation may be obtained using a data map to which the speed of the vehicle may be input and from which the gain value may be output. The gain value in the supplementary calculation may be proportional to the speed of the vehicle. When acceleration or rapid acceleration is attempted during driving at greater than average speeds, the motor power ascension speed should be faster to ensure the same acceleration performance as low speed driving or slow acceleration (dt2<dt1). Therefore, it is necessary to increase the output power of the fuel cell rapidly and to maintain a substantial amount of air flow through a sudden increase of the air requirement amount of the fuel cell. Consequently, according to the speed of the vehicle, the supplementary amount (e.g., the value for supplementary air intake) to be added to the current command value (e.g., the value for basic air intake) should be increased with the speed of the vehicle. The proportional gain value may be implemented using the data map based on the speed of the vehicle.

Additionally, in the supplementary calculation, the value for supplementary air intake may be calculated by multiplying the rate-of-change of the value of motor current requirement by the gain value and then by the error value of the motor current. The error value of the motor current may be the difference between the value of motor current requirement and the value of the motor current. The error value of the motor current may be normalized by dividing the difference between the value of motor current requirement and the value of the motor current by the value of motor current requirement. Finally, in the supplementary calculation, the value for supplementary air intake may be calculated by multiplying the rate-of-change of the value of motor current requirement by the gain value and then by error value of the motor current, the gain value being increased or decreased with the speed of the vehicle.

As the actual output power of the motor reaches the motor requirement current with an increase in the output power of the fuel cell, the supplementary amount (e.g., the value for supplementary air intake) to be added to the current command value (e.g., the value for basic air intake) may be decreased to prevent excessive air supply and to avoid dry-out. Accordingly, the supplementary amount of current may be decreased with the value normalizing the error value of the motor requirement current. Consequently, when beginning acceleration, a particular degree of excess air may be supplied, and as the actual output power reaches the output power required by the motor, air may be supplied as necessary, and not oversupplied. Due to the above process, the sense of acceleration may be improved at the beginning of acceleration and dry-out of the fuel cell may be prevented when the speed reaches the target speed.

Moreover, a method for controlling an air intake of a fuel cell vehicle may include, calculating a value for basic air intake of the fuel cell based on a driver requirement; calculating a value of motor current requirement based on the driver requirement; calculating a rate-of-change of the value of motor current requirement; calculating a value for supplementary air intake by adding a reflection value based on the speed of the vehicle to the product of the rate-of-change of the value of motor current requirement and a gain value; calculating a value for final air intake by adding the value for basic air intake and the value for supplementary air intake; and operating an air blower of an air intake system of the fuel cell with the value for final air intake.

This method is different in that the value for supplementary air intake may be calculated by additionally adding the reflection value based on the speed of the vehicle to the product of the rate-of-change of the value of motor current requirement and the predetermined gain value. In other words, the speed of the vehicle may be reflected by adding a differently defined reflection value instead of by multiplying a gain value as a variable value.

Consequently, the reflection value in the supplementary calculation may be obtained using a data map to which the speed of the vehicle may be input and from which the reflection value may be output. The reflection value in the supplementary calculation may be proportional to the speed of the vehicle. In other words, the method for controlling the air intake of the fuel cell vehicle according to an exemplary embodiment of the present invention, may include calculating the value for basic air intake of the fuel cell and the value of motor current requirement based on the driver requirement, calculating the value for supplementary air intake by multiplying a rate-of-change of the value of motor current requirement by a gain value, calculating the value for final air intake by adding the value for basic air intake and the value for supplementary air intake, and operating the air blower of the air intake system of the fuel cell with the value for final air intake.

Meanwhile, FIG. 2 is an exemplary system for controlling the air intake of the fuel cell vehicle according to an exemplary embodiment of the present invention and the system to implement the control method may include: a vehicle accelerator pedal 200; a vehicle drive motor 300; an air blower 400 configured to supply air to the fuel cell 100; and a controller 600 configured to calculate a value for basic air intake of the fuel cell and a value of motor current requirement based on a degree of engagement of the accelerator pedal, calculate a value for supplementary air intake by multiplying a rate-of-change of the value of motor current requirement by a gain value, and then calculate a value for final air intake by adding the value for basic air intake and the value for supplementary air intake, and operate the air blower with the value for final air intake.

According to the method and the system for controlling the air intake of the fuel cell vehicle as described above, it may be possible to preemptively maintain a particular amount of air flow to supply stable output power when output power of the fuel cell increases. In other words, a shortage of air or an excessive air supply to the fuel cell may be prevented through optimization of the air supply, thus improving durability of the fuel cell. Additionally, as output power ascension speed of the fuel cell is improved by maintaining the amount of air flow preemptively, it may be possible to maintain acceleration performance of the vehicle.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling an air intake of a fuel cell vehicle, comprising:
    calculating, by a controller, a value for basic air intake of a fuel cell based on a driver requirement;
    calculating, by the controller, a value of motor current requirement according to the driver's requirement;
    calculating, by the controller, a rate-of-change of the value of motor current requirement;
    calculating, by the controller, a value for supplementary air intake by multiplying the rate-of-change of the value of motor current requirement by a gain value;
    calculating, by the controller, a value for final air intake by adding the value for basic air intake and the value for supplementary air intake; and
    operating, by the controller, an air blower of an air intake system of the fuel cell with the value for final air intake.

2. The method of claim 1, wherein the gain value in the supplementary calculation is increased or decreased based on a speed of the vehicle.

3. The method of claim 1, wherein the gain value in the supplementary calculation is obtained using a data map to which a speed of the vehicle is input and from which the gain value is output.

4. The method of claim 1, wherein the gain value in the supplementary calculation is proportional to a speed of the vehicle.

5. The method of claim 1, wherein the value for supplementary air intake is calculated in the supplementary calculation by multiplying the rate-of-change of the value of motor current requirement by the gain value and then by an error value of the motor current.

6. The method of claim 5, wherein the error value of the motor current is a difference between the value of motor current requirement and a value of a motor current.

7. The method of claim 6, wherein the error value of the motor current is normalized by dividing the difference between the value of motor current requirement and the value of the motor current provided by the value of motor current requirement.

8. The method of claim 1, wherein the supplementary calculation includes:
    calculating, by the controller, the value for supplementary air intake by multiplying the rate-of-change of the value of motor current requirement by the gain value and then by the error value of the motor current,
    wherein the gain value is increased or decreased based on the speed of the vehicle.

9. The method of claim 8, wherein the gain value in the supplementary calculation is proportional to the speed of the vehicle.

10. The method of claim 8, wherein the error value of the motor current is normalized by dividing the difference between the value of motor current requirement and the value of the motor current provided by the value of motor current requirement.

11. A method of controlling an air intake of a fuel cell vehicle, comprising:
    calculating, by a controller, a value for basic air intake of a fuel cell based on a driver requirement;
    calculating, by the controller, a value of motor current requirement based on the driver requirement;
    calculating, by the controller, a rate-of-change of the value of motor current requirement;
    calculating, by the controller, a value for supplementary air intake by adding a reflection value based on a speed of the vehicle to a product of the rate-of-change of the value of motor current requirement and a gain value;
    calculating, by the controller, a value for final air intake by adding the value for basic air intake and the value for supplementary air intake; and
    operating, by the controller, an air blower of an air intake system of the fuel cell with the value for final air intake.

12. The method of claim 11, wherein the reflection value in the supplementary calculation is obtained using a data map to which a speed of the vehicle is input and from which the reflection value is output.

13. The method of claim 11, wherein the reflection value in the supplementary calculation is proportional to the speed of the vehicle.

14. A method for controlling an air intake of a fuel cell vehicle, comprising
    calculating, by the controller, a value for basic air intake and a value of motor current requirement based on a driver requirement;
    calculating, by the controller, a value for supplementary air intake by multiplying a rate-of-change of the value of motor current requirement by a gain value;
    calculating, by the controller, a value for final air intake by adding the value for basic air intake and the value for supplementary air intake; and
    operating, by the controller, an air blower of an air intake system of a fuel cell with the value for final air intake.

15. A system for controlling an air intake of a fuel cell vehicle, comprising:
- a vehicle accelerator pedal;
- a vehicle drive motor;
- an air blower configured to supply air to a fuel cell; and
- a controller configured to operate the air blower by calculating a value for basic air intake and a value of motor current requirement based on an engagement degree of the vehicle accelerator pedal, calculating a value for supplementary air intake by multiplying a rate-of-change of the value of motor current requirement by gain value, calculating a value for final air intake by adding the value for basic air intake and the value for supplementary air intake, and operating the air blower with the value for final air intake.

16. A non-transitory computer readable medium containing program instructions executed by a controller, the computer readable medium comprising:
- program instructions that calculate a value for basic air intake and a value of motor current requirement based on a driver requirement;
- program instructions that calculate a value for supplementary air intake by multiplying a rate-of-change of the value of motor current requirement by a gain value;
- program instructions that calculate a value for final air intake by adding the value for basic air intake and the value for supplementary air intake; and
- program instructions that operate an air blower of an air intake system of a fuel cell with the value for final air intake.

* * * * *